United States Patent [19]

Burkhardt

[11] 4,411,814

[45] Oct. 25, 1983

[54] USE OF POLYAMINES AS DEMULSIFIERS

[75] Inventor: Charles W. Burkhardt, Florissant, Mo.

[73] Assignee: Petrolite Corporation, St. Louis, Mo.

[21] Appl. No.: 233,272

[22] Filed: Feb. 10, 1981

Related U.S. Application Data

[63] Continuation-in-part of Ser. No. 836,123, Sep. 23, 1977, abandoned, which is a continuation-in-part of Ser. No. 814,514, Jul. 11, 1977, abandoned.

[51] Int. Cl.³ .............................................. B01D 17/04
[52] U.S. Cl. ............................. 252/344; 252/8.55 D; 252/331; 252/353
[58] Field of Search ........... 252/344, 353, 331, 8.55 D

[56] References Cited

U.S. PATENT DOCUMENTS

| Re. 22,963 | 1/1948 | Monson et al. | 252/344 |
|---|---|---|---|
| 3,020,206 | 2/1962 | Patton et al. | 195/31 |
| 3,259,587 | 7/1966 | Dickson et al. | 252/344 |
| 3,272,757 | 9/1966 | Kirkpatrick et al. | 252/344 |
| 3,506,070 | 4/1970 | Jones | 166/273 |
| 3,637,521 | 1/1972 | Tsuk | 252/344 |
| 3,900,423 | 8/1975 | Markofsky | 252/344 |

*Primary Examiner*—Maurice J. Welsh
*Attorney, Agent, or Firm*—Sidney B. Ring; Hyman F. Glass; Leon J. Bercovitz

[57] ABSTRACT

This invention relates to the use of polyamines and/or polyamine salts, preferably those having 20 or less amino groups, as demulsifiers. This invention is particularly useful in breaking emulsions formed in surfactant flooding of oil bearing subterranean formations.

15 Claims, No Drawings

USE OF POLYAMINES AS DEMULSIFIERS

This application is a continuation-in-part of Ser. No. 836,123, filed Sept. 23, 1977, which in turn is a continuation-in-part of Ser. No. 814,514, filed July 11, 1977, both now abandoned.

In oil field production, additional oil can be recovered from a formation by waterflooding. This technique of oil recovery involves the injection of water into the oil producing formation in secondary water floods thereby displacing the oil. The success of a water flood operation is dependent on the effectiveness by which the water replaces oil from the pores of the rock or sand formation. An improved technique used to more effectively achieve this displacement is to reduce the interfacial tension between the oil and water phases. The addition of surfactants to the injection fluids reduces the interfacial tension between the oil and water phases. The net result is an improved displacement of oil from the pores of the formation.

However, the use of surfactants to reduce the interfacial tension causes the formation of stable oil-water emulsions. These emulsions are difficult and expensive to resolve. One example of a surfactant flood involves the injection of low concentrations of petroleum sulfonates into the water. An improvement of this involves the use of petroleum sulfonates followed by the injection of mobility control agents such as solutions of high molecular weight polymers. Another example is to use high concentrations of sulfonate surfactant as a micellar emulsion slug followed by a mobility control agent. Other variations can also be used.

I have now devised a method of resolving the emulsions and the destabilization of entrapped water in the form of micells or solubilized by petroleum sufonates during the tertiary recovery of crude oil sulfonates produced from such improved recovery methods (sometimes called chemical floods, surfactant floods, Maraflood ®, etc.) so as to yield clean oil with a minimum of tank bottoms or interfacial buildup of sludge or emulsion. This process comprises treating petroleum emulsions with polyamines and/or salts thereof.

The effective polyamines or salts thereof (reverse compounds) used to break the reverse emulsions from Sulfonate floods are of the type

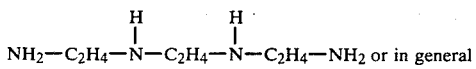

$NH_2-C_2H_4-\overset{H}{\underset{|}{N}}-C_2H_4-\overset{H}{\underset{|}{N}}-C_2H_4-NH_2$ or in general

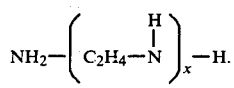

$NH_2-\left(C_2H_4-\overset{H}{\underset{|}{N}}\right)_x-H.$ and as high as 19, and is preferably 6 or 7. The effective molecular weight range is from 60 to 600 and is preferably from 100 to 300.

The polyamines or salts thereof must be water soluble, or at least water dispersible, since they are added to the external water phase. They are highly surface active and adsorb at the oil-water interface. Crude oil droplets, in the pH range ordinarily found in production, will possess negative charges so that the polyamines or reverse compounds will generally be of a positive nature to help insure adsorption. Once adsorbed on the oil surface the reverse compound either displaces the connate surfactant, or complexes with it in such manner as to provide a surface film that is more mobile—has a lower viscosity and strength. When the oil droplets so treated collide they coalesce.

In have further discovered that optimum results are effected by employing polyamines and/or salts of polyamines containing 20 or less amino groups. The polyamines and/or salts thereof which may be individual polyamines or mixtures of polyamines preferably have about 20 or less amino groups, such as from about 2 to 20 amino groups, for example from about 3 to 12 amino groups, but preferably from about 3 to 8 amino groups. This result is unexpected since it is conventionally believed that the higher the number of amino groups the more effective the resolution of the emulsion. However, I have found that where higher polyamines are employed with surfactant floods heavy flocs are formed which are difficult to resolve.

An amine with a sufficiently large hydrophilic portion couples with the oil soluble petroleum sulfonate to form a salt. The hydrophilic portion of the salt formed in situ in the crude oil/water mixture must be strong enough to then remove it from the bulk oil phase and be disposed of with the water or remain at the oil/water interface in the treating vessel.

If the hydrophilic portion is too small, the hydrophobic portion of the petroleum sulfonate will cause the salt to be retained in the crude oil, which will cause problems later during the desalting process in the refinery as well as retaining a larger than allowable percentage of water in the treated crude oil.

If the amine is of too high a molecular weight, such as polymerized amines and other higher molecular weight amines used for normal water clarification of oil-in-water emulsions, the amount required will be too excessive for economical dehydration of the crude oil.

I have further characterized these polyamines as non-flocculating polyamines. In general, flocculation is a characteristic of the higher polyamines. Thus as the number of amino group increases above 20 units, depending on the particular amine, the polyamine tends to become relatively more flocculating.

The amine must have water solubility, but not oil solubility. Also, the amine must have a long enough hydrophilic portion so that, when it couples with the sulfonate, the resultant salt (the amine sulfonate) will still have water solubility.

The polyamine may be expressed by the general formula

$Z(N)_n H$ where Z is the non-amino moiety, (N) is the amino moiety of the polyamine, and n is a number, for example 20 or less.

A more specific embodiment can be expressed by the formula

$RN(AN)_nH.$
$\overset{R}{\underset{|}{}} \quad \overset{R}{\underset{|}{}}$ where the R's are hydrogen, alkyl, alkanol, alkanol ether such as $-B-(O-B)_MOH-$, etc. where B is alkylene; and m is a number such as 1 or greater, etc. A is alkylene, such as $-(CH_2)_x$, where x is for example 2-10 or greater, or $-B(OB)_m$ having the same meaning as stated above.

For example, a suitable polyamine could be expressed by the general formula

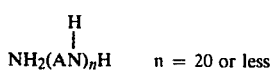   n = 20 or less where A is $(CH_2)_{2-6}$.

The polyamine can be derived from condensing alkanolamines such as triethanolamine to yield a complex polyamine containing multiple amino groups, ether groups and alcohol groups, with cyclic components (e.g., substituted dioxanes).

The following are specific examples of polyamines which can be employed in this invention (1) Polyalkylene polyamines of the formula

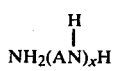

where $x = 2-19$ and A is alkylene $+(CH_2)+2-10$ and most preferably

including diethylenetriamine, triethylenetetramine, tetraethylene pentamine and higher polyamines.

One example of such higher polyamines are the residues of the reaction products of $NH_3$ + ethylenedichloride after the removal of lower polyamines, having 6 amino units or less, an example of which is Polyamine A which is as follows:

Polyamine A

| | |
|---|---|
| triethylene tetramine | 1–2% |
| tetraethylene pentamine | 9–10% |
| pentaethylene hexamine | 22–23% |
| hexaethylene heptamine and highers | 65–66% |
| nitrogen-total | 30–33% |
| primary nitrogen | 12–15% |
| secondary nitrogen | 3–6% |
| tertiary nitrogen | 5–8% |

Polyamine B

Another example of higher polyamines is Polyamine B formed by reacting Polyamine A with ethylene dichloride to increase its molecular weight.

(2) Polyhexamethylene polyamines of the formula

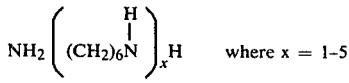    where $x = 1-5$ preferably $NH_2[(CH_2)_6NH]_2H$

These products may also contain diaminocyclohexane and such mixtures are useful for use in this invention.

(3) Polyalkanolpolyamines prepared by condensing triethanolamine; and triethanolamine still bottoms (i.e., the residue left after the distillation of triethanolamine) which are condensed triethanolamines.

(4) Polyamines derived from the reaction of alkylamines, such as methylamine, with epichlorohydrin.

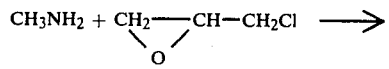

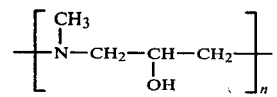

(5) and other polyamines.

The polyamines can be used as such or as their full (or partial) salts derived from reaction with acids, preferably a hydrohalic acid such as HCl, etc.

Alternately, the free base can be used and the pH of emulsion can be lowered by use of these same acids.

A more detailed description of a surfactant flood is a petroleum sulfonate flood.

Aqueous petroleum sulfonate mixtures are effective to recover crude oil in improved recovery processes. For example, the mixture can be injected into an oil-bearing subterranean formation and displaced towards a production well to recover crude oil. Mobility buffer slugs, i.e., aqueous solutions containing mobility controlling agents, can be injected behind the surfactant mixture to improve oil recovery.

U.S. Pat. Nos. 3,254,714 and 3,275,075 to Gogarty et al., 3,497,006 to Jones et al., and 3,506,070 to Jones teach processes using petroleum sulfonate in micellar dispersions. Optionally a viscosity increasing agent, mobility agent, hydrocarbon, cosurfactant, electrolyte, or combination thereof can be incorporated into the mixture. Examples of amounts include 1 to about 25 percent, preferably about 2 to about 15 percent and most preferably at least about 4 percent by volume of petroleum sulfonates, about 0.01 to about 20 percent by volume cosurfactant, about 0.001 to about 5 percent by weight (based on aqueous medium) of electrolyte, about 1 to about 90 percent and preferably at least about 4 percent by volume hydrocarbon, about 0.001 to about 1 percent or more by weight of the viscosity-increasing agent and/or mobility control agent and the residue aqueous medium (preferably at 5 to about 95 percent by volume). The aqueous mixture can be a micellar dispersion (this term as used herein includes micellar solution and micro-emulsion), and emulsion, solution, etc.

The aqueous medium can be soft water, water containing minor amounts of salts, or brackish water. The cosurfactant can be an amine, aldehyde, ketone, hydroxy-containing compound (including conventional alcohols), ester, ether, or similar compound containing one or more of hydroxy, oxy, amide, halide, etc.; the cosurfactant contains 1 to about 20 or more carbon atoms and preferably about 3 to about 8 carbon atoms. Numerous electrolytes are useful; preferably they are inorganic acids, inorganic bases, and inorganic salts. The hydrocarbon can be crude oil, a partially refined fraction of crude oil, or refined fraction of crude oil, or synthetic hydrocarbon (including halogenated hydrocarbons); the hydrocarbon can be unreacted hydrocarbon within the petroleum sulfonate. Examples of patents which teach particular components useful in the aqueous sulfonate mixture include: U.S. Pat. Nos. 3,254,714 to Gogarty et al.; 3,307,628 to Sena; 3,330,343 to Tosch et al.; 3,356,138 to Davis et al.; 3,287,084 to Gogarty et al.; 3,476,184 to Davis; 3,497,006 to Jones et al.; 3,493,047 to Davis et al.; 3,493,048 to Jones;

3,500,912 to Davis et al.; 3,504,744 to Davis et al.; 3,506,070 and 3,506,071 to Jones; and 3,508,611 to Davis et al.

Examples of viscosity increasing agents are the bipolymers such as polysaccharide polymers (e.g., defined in U.S. Pat. Nos. 3,020,206 to Patton et al. and 3,020,207 to Patton) or any high molecular weight organic polymer that tends to increase the viscosity of the water and which will not substantially adsorb onto the reservoir rock. Examples of mobility control agents include acrylamide polymers, e.g., the partially hydrolyzed, high molecular weight polyacrylamides such as the Pusher ® polymers marketed by Dow Chemical Co., Midland, Mich.; copolymers of acrylamide and acrylic acid or sodium acrylate, N-sulfohydrocarbon-substituted acrylamides (e.g., defined in U.S. Pat. No. 3,679,000 to Kaufman), and commercially available polymers such as Betz Hi-Vis and Bet-Uni-Perm polymers (Betz Laboratories, Inc., Trevose, Pa.), acrylamide polymers sold by Calgon Corporation, Pittsburgh, Pa., and acrylamide copolymers marketed by Nalco Chemical Co., Chicago, Ill. Any high molecular weight polymer which tends to reduce the mobility of the aqueous surfactant mixture flowing through the reservoir rock is useful with this invention. The agents can be present in concentration ranges of about 0.001 to about 1 percent and preferably about 0.01 to about 0.5 percent and more preferably about 0.02 to about 0.1 percent by weight, based on the aqueous mixture.

Other additives, such as corrosion inhibitors, oxygen scavengers, bactericides, etc., can be added to the mixture.

The petroleum sulfonates can be obtained by sulfonating hydrocarbon feedstocks, e.g., heavy vacuum gas oil, having molecular weights within the range of about 300 to about 650 and more preferably about 400 to about 470. Sulfonation of the feedstock is effected by methods known in the art, e.g., with oleum or sulfur trioxide in the absence or presence of a solvent such as ethylene dichloride, sulfur dioxide, unreacted hydrocarbon, etc. The sulfonic acid is neutralized with a basic compound such as sodium hydroxide, ammonia, ammonium hydroxide, etc.

Examples of volume amounts of useful aqueous petroleum sulfonate mixtures injected into the reservoir are about 1 to about 50 percent or more formation pore volume, preferably about 1 to about 15 and most preferably about 2 to about 10 percent formation pore volume. Larger pore volumes are, of course, useful where the economics of the process justifies same.

Preferably, the aqueous sulfonate mixture is followed by a mobility buffer slug. The mobility buffer slug is preferably an aqueous solution containing a mobility control agent such as a partially hydrolyzed, high molecular weight polyacrylamide, e.g., the Pusher ® polymers marketed by Dow Chemical Co., Midland, Mich., a high molecular weight polyalkylene oxide polymer, high molecular weight acrylamide polymers containing sulfo grouping (e.g., those defined in U.S. Pat. No. 3,679,000, to Kaufman), acrylamide copolymers (e.g., copolymers of acrylamide and sodium acrylate), etc., biopolymers (preferred in low permeability reservoirs) and any high molecular weight polymer that is compatible within the reservoir and which tends to reduce the mobility of the aqueous solution flowing through the reservoir rock. The mobility control agent can be injected into the reservoir in volume amounts of about 5 to about 150 percent, preferably 25 to about 75 percent and more preferably 50 to about 60 percent formation pore volume. The mobility control agent can be present in concentrations of about 50 to about 2,000, preferably about 100 to about 1,500 and more preferably about 200 to about 1,000 ppm, based on the water.

A water drive is injected into the reservoir to displace the aqueous sulfonate mixture and optionally the mobility control toward a production well to recover crude oil therethrough. Preferably, the water is compatible with the back portion of the mobility control agent and/or the aqueous sulfonate mixture, e.g., preferably it does not substantially leach water soluble components out of the preceding slug. Where the water drive contains ions, it is preferred that these ions are compatible with those within the reservoir.

Preferably, the "mobility profile" of the overall process is graded from a "low" mobility equal to or less than the mobility of the combination of formation fluids (crude oil and interstitial water within the formation) to a "high" mobility equal to or approaching that of the injected water drive. The mobility of the front, midsection, and back portion of the mobility buffer and optionally of the aqueous sulfonate slug can be designed by adjusting the viscosity and/or mobility control agent concentration to obtain desired mobility characteristics to the process.

In general, the process of resolving the emulsion is carried out in the following manner. The treatment is initiated by addition of the polyamine and/or salt thereof, at a point whereby the polyamine and/or salt thereof becomes well mixed with the emulsion. The polyamine and/or salt thereof is added as the polyamine or salt thereof or a salt is formed in situ by employing an acid for pH adjustment, such as hydrochloric acid. The point of addition for the polyamine and/or salt is selected so that the optimum mixing and contact time are provided before the emulsion reaches a quiet zone in the treatment apparatus. Once the oil and water phase start to separate a minimum of agitation is desired. Since the two phases can be readily reemulsified by excessive agitation of the system. Typically, in an oil field the polyamine and/or salt thereof is injected into the flow line at a well or a junction of several wells to permit mixing while the fluid is flowing to the treatment equipment. The polyamine and/or salt thereof or polyamine and acid (where required) are then injected into the flow line or treater vessel at a point which provides just sufficient agitation to mix these chemicals into the emulsion.

The emulsion is then allowed to pass through a region of low flow velocity where the resolution of the emulsion into separate phases takes place. Heat may be applied to the system, but may not always be necessary.

The addition of acid may be used to adjust the pH of the system to the optimum range for resolution of the emulsion. This pH range depends on the particular oil-water emulsion being treated.

The following field examples are presented for purposes of illustration and not of limitation.

EXAMPLE I

This treatment has been successfully applied to several surfactant (petroleum) floods in Eastern Illinois. In one flood, surfactant and mobility control agents had broken through the formation and were being produced with the oil. The presence of these agents in the produced fluid resulted in a very stable oil in water (reverse) emulsion.

EXAMPLE IA

Treatment of the emulsion with a usual commercial reverse deemulsifier, at a high concentration of 700 ppm was not satisfactory in that more than 3000 ppm of oil remained in the water phase and was not recovered.

EXAMPLE IB

Polyamine A was injected at 160 ppm, along with sufficient hydrochloric acid to maintain the pH at 5–5.7. In this manner treatment costs were reduced considerably and the oil remaining in the water phase was reduced to 400 ppm. The use of Polyamine A and hydrochloric acid also avoided the build up of the heavy thick rubbery interface between the water and oil phases, which is characteristic of the type of interface formed when production containing a mobility control agent is treated with the conventional type deemulsifier as occurred in IA.

EXAMPLE II

In certain fields pH adjustments in treating these types of surfactant floods is required. For example, in resolving a reverse emulsion stabilized by petroleum sulfonate at pH 7.0 requires 425 ppm of Polyamine B. At pH 8.0 the amount of polyamine required rises to 600 ppm, an increase of about 41%. Conversely at a pH of 5.0 the amount of condensed polyamine needed drops to 325 ppm or a decrease of about 25%. Although the use of the polyamine without acid is effective the addition of an acid, such as hydrochloric acid, is obviously beneficial in reducing treatment costs.

Although I do not wish to be bound by theoretical considerations, it is believed that in certain fields with HCl the amine treating agent assumes a more positive character due to protonation, and the sulfonate stabilizing agent becomes more neutral for the same reason. The overall effect is to require less polyamine to destabilize the emulsion.

The above example is not meant to restrict pH control to the range of 5.0 to 6.0 since with certain floods other pH ranges may be more advantageous.

EXAMPLE III

In addition to their use as demulsifiers in surfactant floods, these amines will also function as reverse deemulsifiers on emulsions that are produced during normal water flooding operations, i.e., those encountered with secondary recovery.

For example, a reverse emulsion (oil-in-water) containing 2% of an oil from New Mexico was allowed to separate by sedimentation. After 6 hours of separation time the water phase still contained 1160 ppm oil. The addition of 15 ppm of Polyamine A with pH adjustment to 4.5 reduced the oil in the water phase to 160 ppm.

In order to optimize demulsification, the polyamine is added in salt form or the polyamine added per se and converted to the salt in situ by pH adjustment, i.e., below about pH 7, such as from about 1 to 6.5, but preferably about 4.5 to 6. In certain instances, the polyamine itself is effective as illustrated by the following example.

EXAMPLE IV

Whether the polyamine or the polyamine salt is employed will depend upon the particular system treated. In certain instances the polyamine itself is effective. For example, two separate portions of a stable oil-in-water emulsion from a Kansas crude, containing 5.0% oil by volume were treated with 400 mg. per liter (400 ppm) of a commercial deemulsifier, and 400 mg. per liter of Polyamine A. The original pH of this emulsion was 7.0 and was not changed by the addition of acid, or phase. After a suitable time for separation the water phase from the portion of the emulsion treated with the commercial deemulsifier still contained 2.63% of oil by volume. In contrast the aqueous phase of the portion treated with Polyamine A contained only 0.325% oil. Thus these polyamines can function as deemulsifiers without a pH change of the fluid to be treated.

Thus, the invention involved demulsification with a polyamine and/or salt thereof or demulsification with polyamine where the polyamine salt is formed in situ. All claims relating to treating an emulsion with polyamine salts include the pre-formation of the salt or the formation of the salt in situ.

I claim:

1. A process for the resolving of emulsions and the destabilization of entrapped water in the form of micells or solubilized by petroleum sulfonates during the tertiary recovery of crude oil by sulfonate floods, said emulsion containing a petroleum sulfonate, a mobility control agent and a viscosity treating agent which comprises treating said emulsion with 160 ppm to 600 ppm of a polyamine, a polyamine salt or a polyamine and a polyamine salt at a pH of below about 7, said polyamines having the general formula

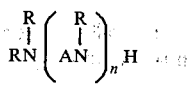

where R is hydrogen, alkyl, alkanol or alkanol ether and A is alkylene having from 2 to 10 carbon atoms, where n is greater than 1 and up to 19 and have a molecular weight of 60 to 600, said polyamines being water soluble or water dispersible and having a hydrophilic portion sufficiently large to couple with the oil soluble petroleum sulfonate to form a salt.

2. The process of claim 1 where the polyamine is a non-flocculating polyamine.

3. The process of claim 2 where the polyamine has 20 or less amino units.

4. The process of claim 3 where the polyamine is a polyalkylene polyamine.

5. The process of claim 3 where the polyamide is a polyalkanol polyamine.

6. The process of claim 5 where the polyalkanol polyamine is polytriethanol amine.

7. The process of claim 2 where the polyamine is the reaction product of epichlorohydrin and an amine.

8. The process of claim 7 where the amine is methyl amine.

9. The process of claim 1 where the mobility control agent is a high molecular weight polyacrylamide.

10. The process of claim 1 where the viscosity increasing agent is a polysaccharide polymer.

11. The process of claim 1 where the pH of the emulsion is adjusted to 4.5 to 6.

12. The process of claim 1 where the emulsion is treated with a polyamine.

13. The process of claim 1 where the emulsion is treated with a polyamine salt.

14. The process of claim 1 where the emulsion is treated with a polyamine and a polyamine salt.

15. The process of claim 1 where the molecular weight of the polyamine is 100 to 300.

* * * * *